US008380394B1

(12) United States Patent
Snodgrass

(10) Patent No.: US 8,380,394 B1
(45) Date of Patent: Feb. 19, 2013

(54) AUTOMOBILE MOTION SYSTEM

(76) Inventor: Gary Snodgrass, Las Vegas, NV (US)

( * ) Notice: Subject to any disclaimer, the term of this patent is extended or adjusted under 35 U.S.C. 154(b) by 0 days.

(21) Appl. No.: 13/419,549

(22) Filed: Mar. 14, 2012

Related U.S. Application Data

(60) Provisional application No. 61/452,596, filed on Mar. 14, 2011.

(51) Int. Cl.
*B62K 27/08* (2006.01)
(52) U.S. Cl. ......................................... 701/37; 280/5.507
(58) Field of Classification Search ................ 280/5.5, 280/5.505, 5.507, 5.512, 5.514, 5.515; 701/37, 701/48, 91
See application file for complete search history.

(56) References Cited

U.S. PATENT DOCUMENTS

| | | | |
|---|---|---|---|
| 4,683,992 A | 8/1987 | Watanabe | |
| 5,016,909 A | 5/1991 | Lin | |
| 5,060,959 A | 10/1991 | Davis et al. | |
| 5,184,842 A | 2/1993 | Stockton | |
| 5,466,007 A | 11/1995 | Smith | |
| 5,527,059 A | 6/1996 | Lee, Jr. | |
| 6,168,171 B1 | 1/2001 | Shono et al. | |
| 6,240,348 B1 | 5/2001 | Shono et al. | |
| 6,418,348 B1 | 7/2002 | Witte | |
| 6,470,248 B2 | 10/2002 | Shank et al. | |
| 6,620,023 B2 | 9/2003 | Yeung | |
| 6,873,890 B2 | 3/2005 | Song | |
| 6,983,201 B2 | 1/2006 | Misawa | |
| 7,062,367 B2 | 6/2006 | Kim | |
| 7,168,720 B2 | 1/2007 | Fontdecaba Buj | |
| 7,376,501 B2 | 5/2008 | Misawa | |
| 7,401,794 B2 | 7/2008 | Laurent et al. | |
| 2002/0077026 A1* | 6/2002 | Li | 446/466 |

FOREIGN PATENT DOCUMENTS

CN 201249036 6/2009

* cited by examiner

*Primary Examiner* — Mary Cheung
*Assistant Examiner* — Yuen Wong
(74) *Attorney, Agent, or Firm* — Gold & Rizvi, P.A.; H. John Rizvi

(57) ABSTRACT

An automobile motion system for choreographed independent movement in three degrees of freedom of an automobile body with respect to the automobile wheels includes a central processing unit, a memory communicative with the central processing unit and an instruction set, the execution of which causes the central processing unit to output a programmed sequence of signals. At least one translator interconnects the automobile body with a front suspension assembly, and at least one translator interconnects the automobile body with a rear suspension assembly. Each translator is responsive to the programmed sequence of signals to independently move the automobile body with respect to the front suspension assembly and with respect to the rear suspension assembly in response to the programmed sequence of signals. The system can be adapted to any sized land vehicle, including oversized vehicles, standard vehicles, miniature vehicles, and toys.

20 Claims, 19 Drawing Sheets

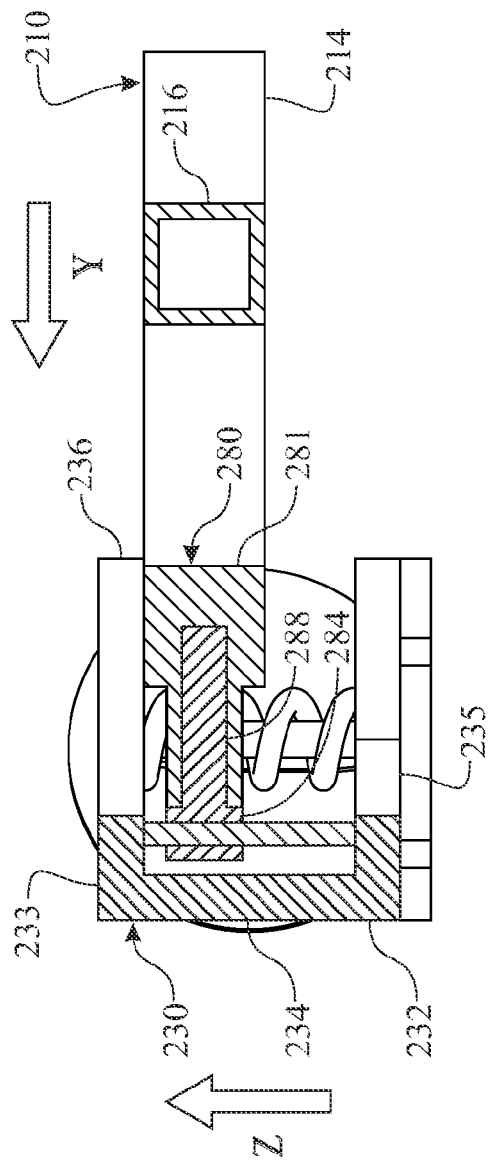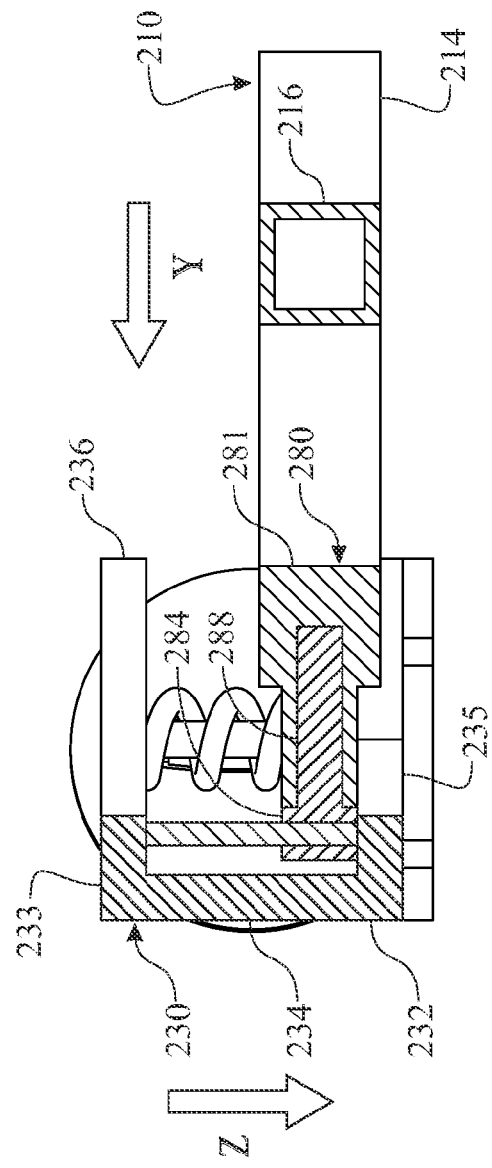

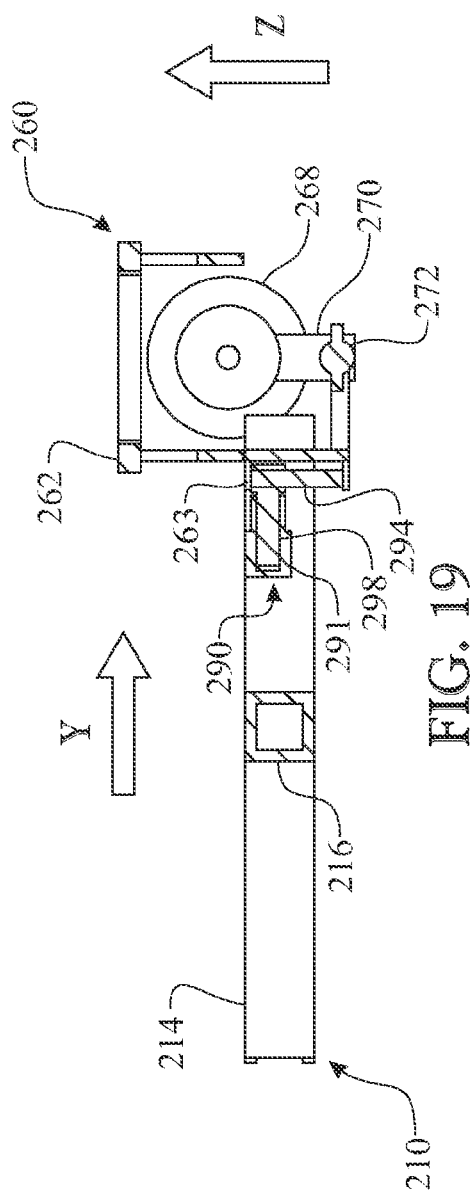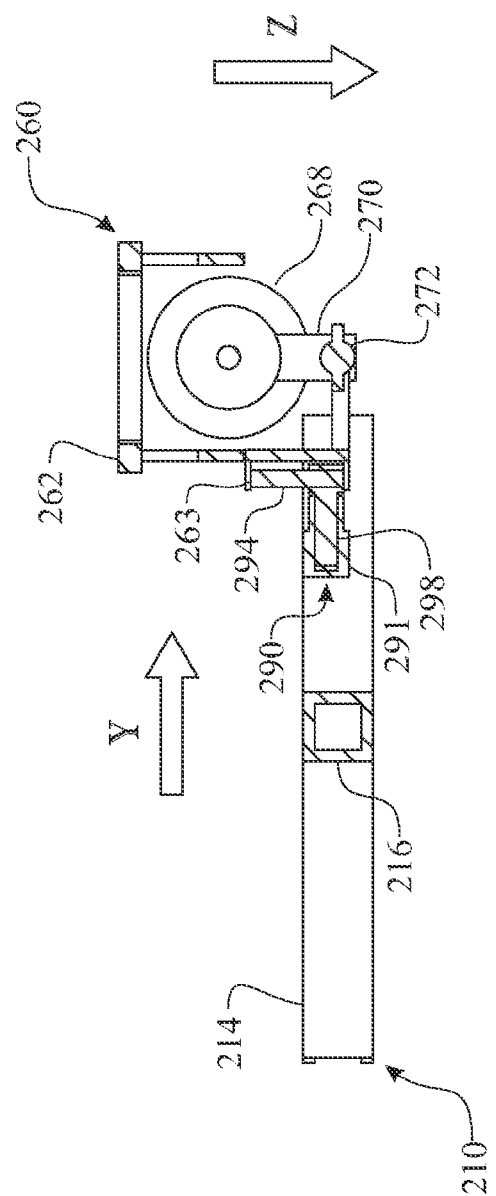

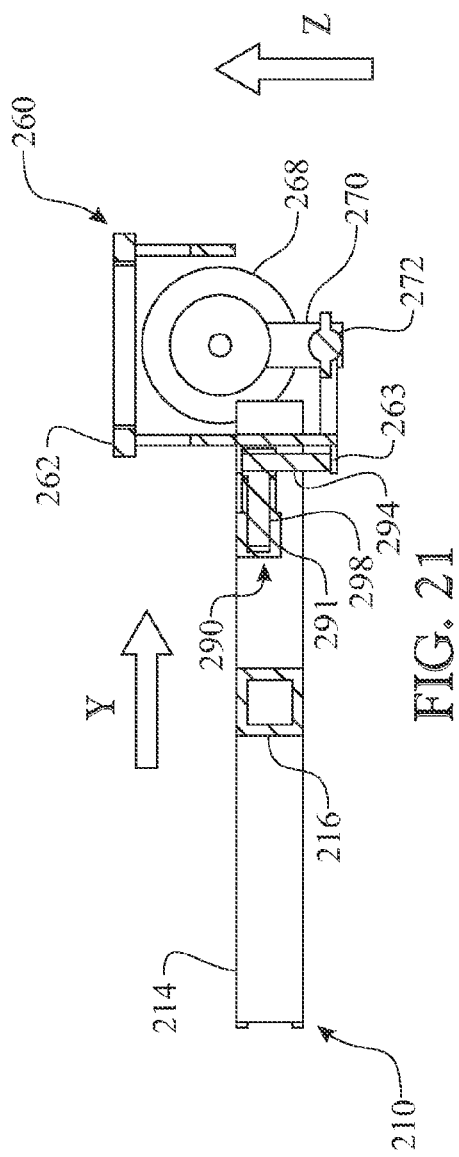
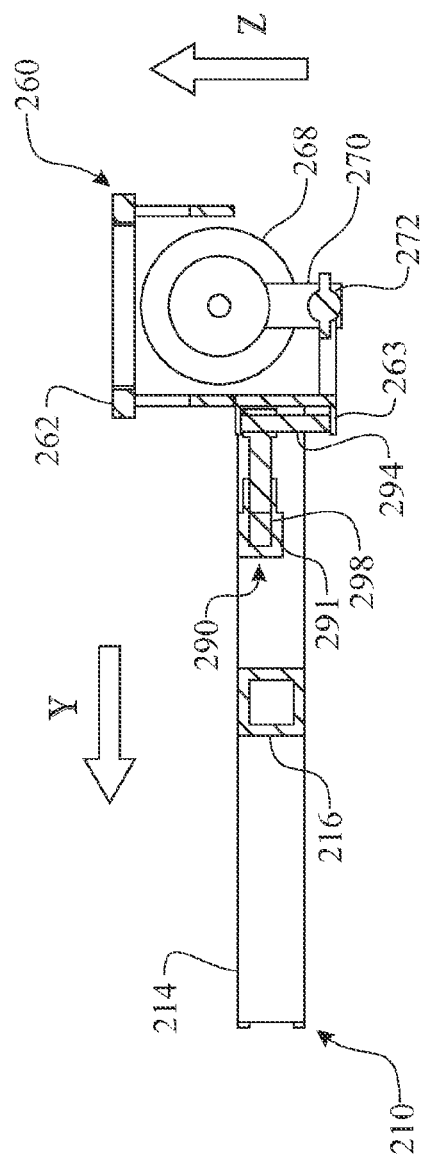

AUTOMOBILE MOTION SYSTEM

CROSS-REFERENCE TO RELATED APPLICATION

This Non-Provisional Utility application claims the benefit of U.S. Provisional Patent Application Ser. No. 61/452,596, filed on Mar. 14, 2011, which is incorporated herein in its entirety.

FIELD OF THE INVENTION

The present disclosure generally relates to a mechanism that moves an automobile body with respect to the automobile suspension. More particularly, the present disclosure relates to a mechanism to move a car body in three axes with respect to the automobile suspension in a programmed manner.

BACKGROUND OF THE INVENTION

The genesis of the automotive industry was centered on improving individual transportation, and with Henry Ford's introduction of the assembly line into the automotive industry automobiles became affordable for most households. Initial automobiles were primarily utilitarian in their design and function; that being of providing a means to travel conveniently from point A to point B and in a shorter period of time than previous modes of transportation. As the industry began to compete more heavily for business, automobile styling became an increased factor of consideration in choosing an automobile. Today, an automobile purchaser will often consider style and appearance of an automobile as a major factor in choosing an automobile to purchase as a personal statement of life style, personality, and even ego satisfaction.

Further, an entire industry has been built around the modification and customization of automobiles enabling an individual to further express themselves through the appearance and function of their personal automobiles. The forms of personal modifications are limitless and range from the 'deuce coupe hot rods of the 50's, to modified muscle cars of the 60's and 70's, and on to the classic car restorations that are popular today. Automobiles have also contributed to leisure time entertainment. Various automobile races such as stock car races, drag races, Formula 1, and Indy car races have become increasingly popular as well and automotive shows of all types for automobile aficionados.

One type of modification that functions as much for entertainment as it does to make a personal statement is to convert an automobile into a 'low-rider'. A low-rider is a style of car that sits lower to the ground than most other car styles. Many low-riders have its suspension system modified so that it can change height at the flip of a switch. Most often, this is accomplished through the use of hydraulics. The cars most modified into lowriders are automobiles from the 40's, 50's and 60's.

Initially, lowriders were modified to ride as low to the road surface as possible. However, laws, such as the laws in California, were enacted to limit how low an automobile could ride. In order to bypass these laws, customizers included hydraulic pumps in the auto's suspension that allowed the user to change the ride height at will at the flick of a switch. Between 1960 and 1975, customizers adapted and refined automotive frames, hydraulics and airbrushing techniques to create the modern lowrider style.

The hydraulic systems utilised in lowriders range from simple to complex and are usually measured by the number of hydraulic pumps (generally 2 to 4) used to control the various hydraulic combinations that ultimately produce a specific motion from the vehicle. These pumps are powered by multiple batteries usually installed in a rack in the trunk of the vehicle. The most common motions are dipping or raising the four corners of the vehicle, dipping or raising the front or rear of the vehicle, dipping or raising the sides of the vehicle, and lowering or raising the vehicle as a whole. However, these systems are limited to providing linear motion only along a single axis, namely the vertical axis most commonly referred to as the z-axis. These systems do not provide motion front to back (y-axis), or side to side (x-axis). In addition, these systems do not provide a mechanism to move the vehicle in any direction; within precise, controlled time limits as necessary to move the vehicle in concert with musical notes or beats.

Therefore, a system is needed by which an automobile operator can translate the body of an automobile in three degrees of freedom with respect to the wheels of an automobile to permit a user to program or perform a choreographed movement of the automobile body with respect to its wheels.

SUMMARY OF THE INVENTION

The present disclosure is generally directed to an automobile motion system for choreographed movement of an automobile body in three degrees of freedom with respect to its wheels. The automobile motion system includes a central processing unit, a memory communicative with the central processing unit, an instruction set resident on the memory and executable by the central processing unit wherein execution of the instruction set causes the central processing unit to output a programmed sequence of signals. A main frame mounts the automobile body thereon. A front suspension assembly, and at least one front translator communicative with the central processing unit and interconnecting the front suspension assembly with the main frame for independently translating the body of the automobile in three axes with respect to the front suspension assembly. The front translator is responsive to the programmed sequence of signals to move the automobile body with respect to said front suspension assembly. A rear suspension assembly, and at least one rear translator communicative with the central processing unit and interconnecting the rear suspension assembly with the main frame for independently translating the body of the automobile in three axes with respect to the rear suspension assembly. The rear translator is responsive to the programmed sequence of signals to move the automobile body with respect to the rear suspension assembly in response to the programmed sequence of signals.

In another aspect, the motion system includes an auxiliary power unit communicative with the central processing unit and responsive to the programmed sequence of signals. The auxiliary power unit is also communicative with and powers each translator in the three dimensional translations.

In still another aspect, the front suspension assembly includes a front sub-frame interfaced with the translator, a left suspension mechanism, a right suspension mechanism; and a wheel hub attached to each of the left and right suspension mechanisms.

In yet another aspect, the automobile motion system includes a left front translator for interconnecting a left side of the front sub-frame with a left front portion of the main frame, and also includes a right front translator for interconnecting a right side of the front sub-frame with a right front portion of the main frame.

In a still further aspect, the rear suspension assembly includes a rear sub-frame interfaced with the translator, a left suspension mechanism, a right suspension mechanism; and a wheel hub attached to each of the left and right suspension mechanisms.

In another aspect, the automobile motion system includes a left rear translator interconnecting a left side of the rear sub-frame with a left rear portion of said main frame, and including a right rear translator interconnecting a right side of said rear sub-frame with a right rear portion of said main frame.

In another aspect, the three axes of translation are a vertical axis, a longitudinal axis, and a lateral axis.

In a still further aspect, each translator includes a housing and at least one vertical actuator, translatable along the vertical axis with respect to the housing and affixed to one of the front sub-frame or rear sub-frame. The translator also includes at least one longitudinal actuator translatable along the longitudinal axis with respect to the housing and is affixed to one of the front or rear sub-frames, and has at least one lateral actuator translatable along the lateral axis with respect to the housing and is affixed to the main frame.

In yet another aspect, each translator includes two lateral actuators translatable along the lateral axis, the actuators being laterally opposed one to the other and slaved one to the other in a manner such that an extension of a first of the lateral actuators is matched by a retraction of a second of the lateral actuators.

In another aspect, a mounting structure for an automobile motion system for independently moving an automobile body with respect to the automobile wheels has a main frame for mounting the automobile body thereon. A front suspension sub-frame for mounting a front suspension thereon is interconnected to the main frame with at least one front translator for independently translating the main frame in three axes with respect to the front suspension sub-frame. The front translator is responsive to external signals to translate the main frame with respect to the front suspension sub-frame. A rear suspension sub-frame for mounting a rear suspension thereon is interconnected to the main frame with at least one rear translator for independently translating the main frame in three axes with respect to the rear suspension sub-frame. The rear translator is responsive to external signals to move the main frame with respect to the rear suspension sub-frame.

In still another aspect the mounting structure includes a left front translator for interconnecting a left side of the front sub-frame with a left front portion of the main frame, and also includes a right front translator for interconnecting a right side of the front sub-frame with a right front portion of the main frame.

In yet another aspect, the mounting structure includes a left rear translator interconnecting a left side of the rear sub-frame with a left rear portion of the main frame, and also includes a right rear translator interconnecting a right side of the rear sub-frame with a right rear portion of the main frame.

In another aspect of the mounting structure, each translator includes a housing and at least one vertical actuator, translatable along the vertical axis with respect to the housing and affixed to one of the front sub-frame or rear sub-frame. The translator also includes at least one longitudinal actuator translatable along the longitudinal axis with respect to the housing and is affixed to one of the front or rear sub-frames, and has at least one lateral actuator translatable along the lateral axis with respect to the housing and is affixed to the main frame.

In still another aspect of the mounting structure, each translator includes two lateral actuators translatable along the lateral axis, the actuators being laterally opposed one to the other and slaved one to the other in a manner such that an extension of a first of the lateral actuators is matched by a retraction of a second of the lateral actuators.

In a still further aspect, a method for choreographing independent movement in three degrees of freedom of an automobile body with respect to the automobile wheels uses an automobile motion system of the type having a central processing unit, a memory communicative with the central processing unit, and an instruction set resident on the memory and executable by the central processing unit. A mounting structure is integrated with the automobile and includes a main frame for mounting the automobile body, a front suspension sub-frame for mounting a front suspension, at least one front translator interconnecting the front suspension sub-frame with the main frame, and at least one rear translator interconnecting the rear suspension sub-frame with the main frame. The respective translators include actuators movable in each of three axes and are communicative with and responsive to signals from the central processing unit for translating the main frame with respect to the front and rear sub-frames respectively. The method includes loading a programmed sequence of automobile body translations in the memory, and executing the instruction set stored in the memory. Sequential signals corresponding to the desired sequence of automobile body translations are sent from the central processor to the front and rear translators, and the translator actuators are caused to extend and retract to effect the desired motion of the automobile body.

In another aspect, the loading step includes loading a musical composition to the memory.

In another aspect, and after the loading step, the step of assigning at least one predefined choreographed movement of the automobile body with a designated musical passage of the musical composition is included.

In a still further aspect, the assigning step includes assigning a translational value of the actuators respective to the front and rear translators for each note of a musical scale.

In yet another aspect, the causing step comprises causing the translator actuators to extend and retract in concert to the playing of the musical composition by the central processing unit and according to the assigned musical scale translational value.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which:

FIG. 11 presents a side elevation cross-sectional view of the suspension assembly of FIG. 8, taken along the line 11-11 of FIG. 8 illustrating the vehicle main frame raised with respect to the front suspension assembly;

FIG. 12 presents the side elevation cross-sectional view of FIG. 11 illustrating the vehicle main frame lowered with respect to the front suspension assembly;

FIG. 19 presents a side elevation cross-sectional view of the rear suspension assembly of FIG. 18, taken along the line 19-19 of FIG. 18 illustrating the vehicle main frame raised with respect to the rear suspension assembly;

FIG. 20 presents the side elevation cross-sectional view of FIG. 19 illustrating the vehicle main frame lowered with respect to the rear suspension assembly;

FIG. 21 presents the side elevation cross-sectional view of FIG. 19 illustrating the vehicle main frame raised with respect to the rear suspension assembly and translated longitudinally rearward with respect to the rear suspension assembly;

FIG. 22 presents the side elevation cross-sectional view of FIG. 19 illustrating the vehicle main frame raised with respect to the rear suspension assembly and translated longitudinally forward with respect to the rear suspension assembly;

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
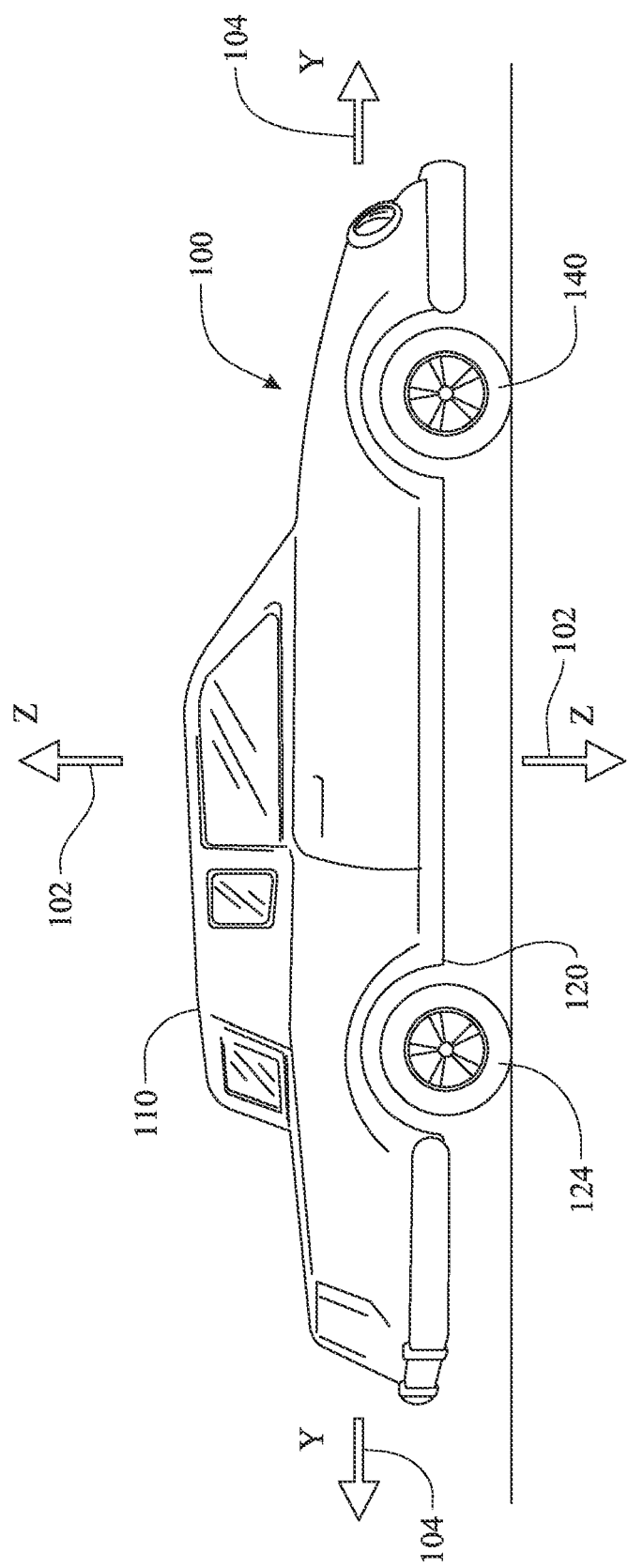
FIG. 1 presents a side elevation view of an automobile illustrating the Y and Z axes of motion with respect to the automobile.
Figure 2:
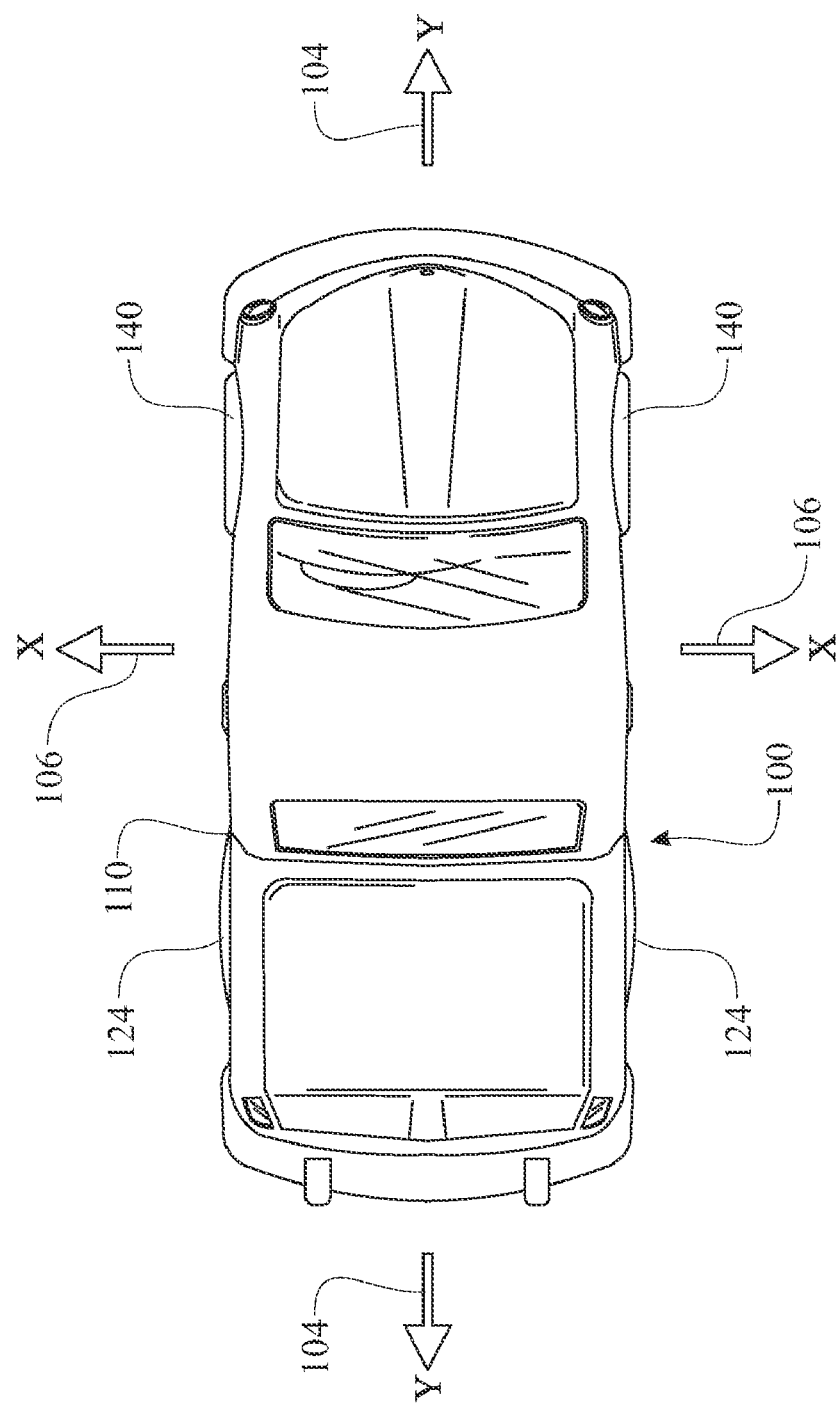
FIG. 2 presents a plan view of an automobile illustrating the X and Y axes of motion with respect to the automobile.

Turning to the drawings, FIGS. 1 and 2 illustrate the three degrees of freedom axes used herein as the preferred convention in describing motion of an automobile 100 or any of its components. FIG. 1 shows a side elevation view of automobile 100 illustrating longitudinal (forward and rearward) motion of the automobile defined as along Y-axis 102 and further wherein vertical motion of the automobile is defined as along Z-axis 104. Additionally, FIG. 2 shows the automobile in plan view further illustrating that lateral (left and right) motion of the automobile is defined as along X-axis 106.

Referring to FIGS. 1 through 6, car 100 has a body 110 and a suspension system 120 attached to body 110 and movable in three dimensions with respect to body 110. Suspension system 120 includes a conventional drive train 122 for powering rear wheels 124. Automobile 100 has been modified in such a way as to render each rear wheel 124 (FIG. 5) and each front wheel 140 (FIG. 6) individually movable with respect to body 110 and also independently movable in all three axes, 102, 104, 106 with respect to the remaining wheels 124, 140 of automobile 100. As an example, conventional drive train 122 can comprise a first axle housing 126 and a second axle housing 128 telescopically slidable within first axle housing 126 thereby allowing rear wheel 124 to move laterally (along X-axis 106) with respect to automobile body 110. Drive train 122 is also modified to permit rear wheels 124 to move along Y-axis 104 independent of body 110. Further, suspension system 120 has been modified at each front wheel 140 such that an upper suspension arm 142 and a lower suspension arm 144 are mounted independent of body 110 to therefore permit wheel 140 to translate in each of the three axes, X, Y, and Z. These modifications are exemplary only and the specific modality of the various modifications to the suspension system to achieve the independent motion of the wheels is outside the scope of this description.

Figure 5:
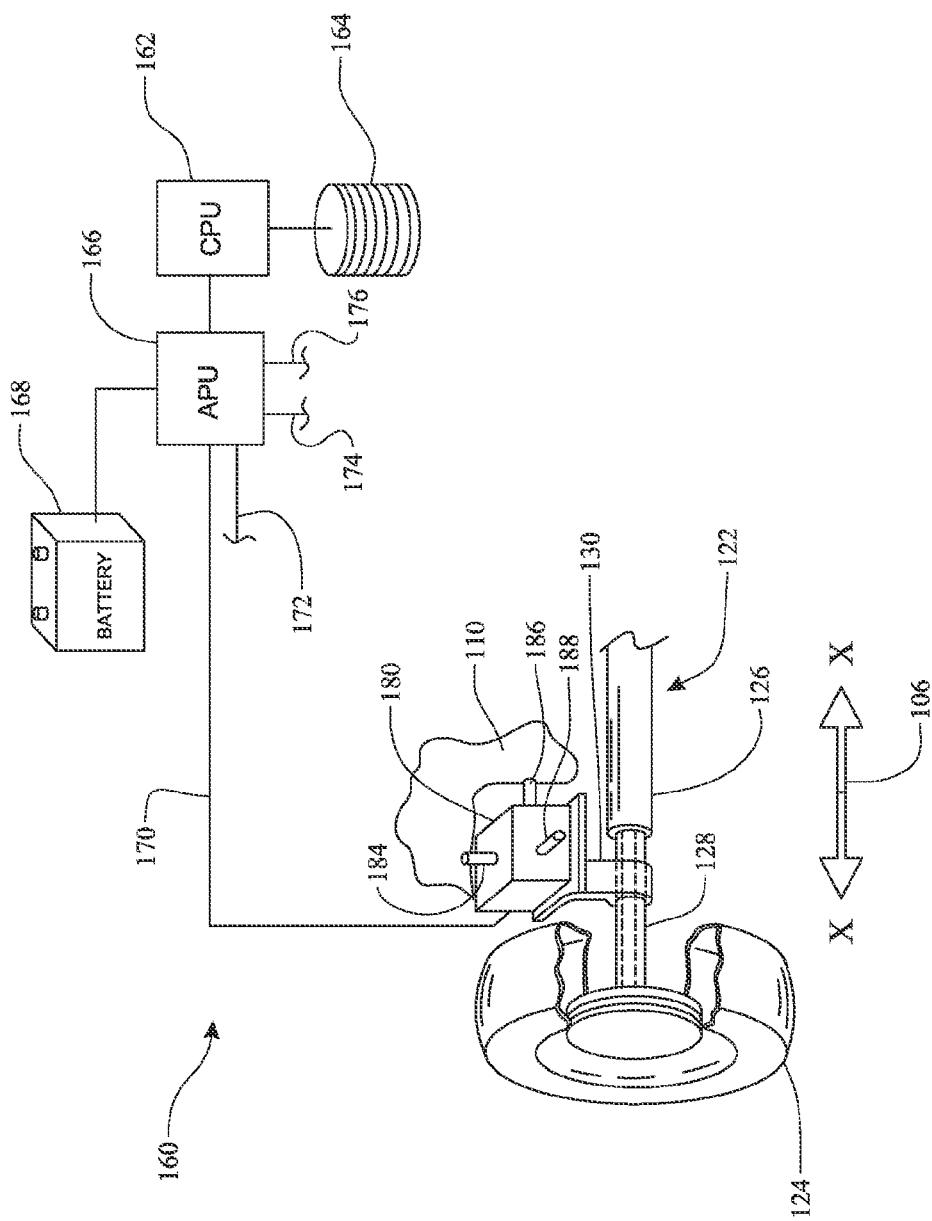
FIG. 5 presents a representative schematic diagram of a motion system for an automobile according to the present invention interfacing with a rear wheel of the automobile.
Figure 6:
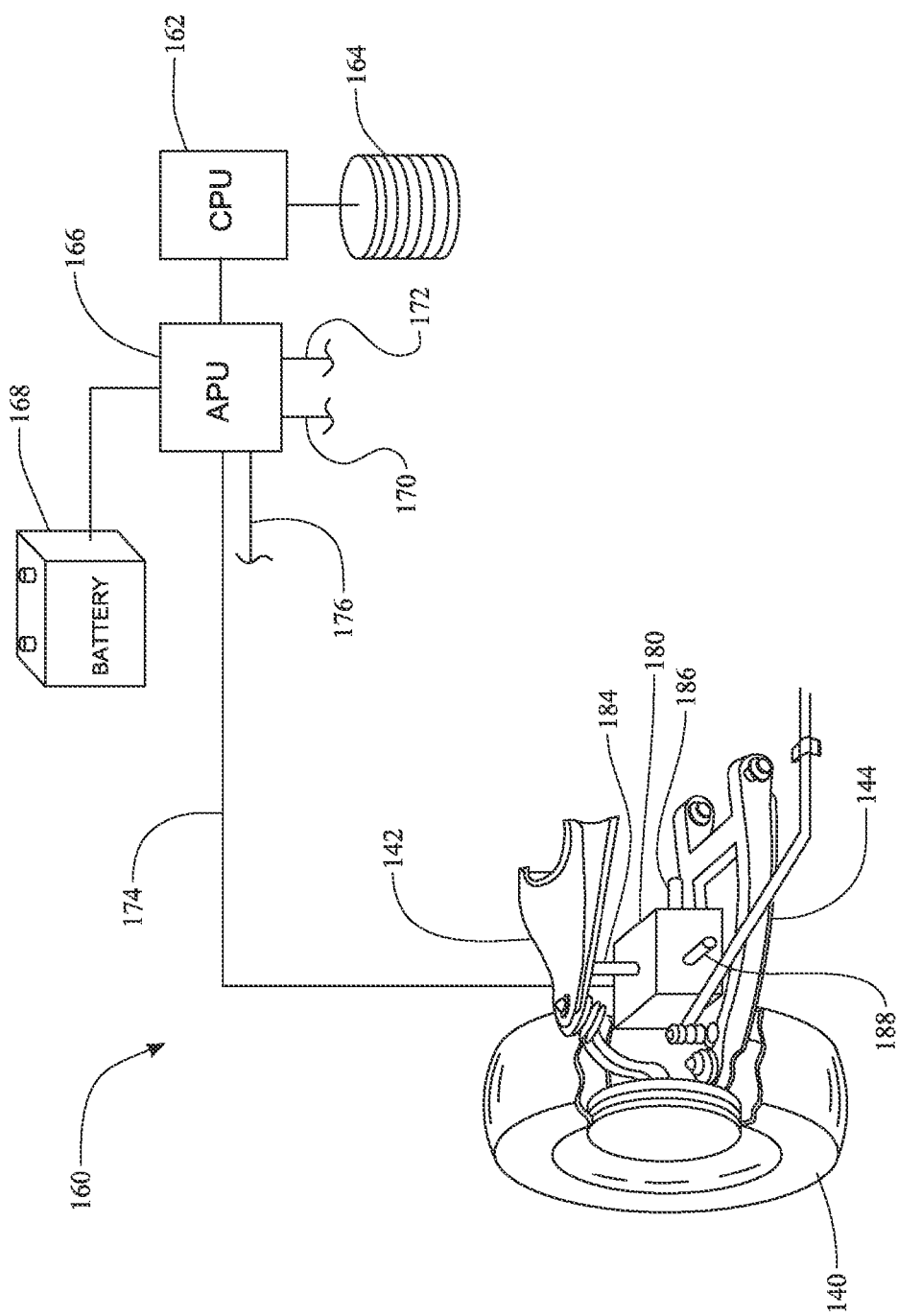
FIG. 6 presents a representative schematic diagram of a motion system for an automobile according to the present invention interfacing with a front wheel of the automobile.

Turning now to FIGS. 5 through 6, the drawings show an automobile motion system 160, which is one of the preferred embodiments of the present invention and illustrates its various components. A central processing unit 162 is electronically communicative with a memory module 164. Memory module 164 has retained therein an instruction set executable by central processing unit 162 to provide control signals for auxiliary power unit 166. Auxiliary power unit 166 is powered by one or more batteries 168, depending on the power requirements of auxiliary power unit 166. A translator mechanism 180 is mounted at each wheel 124, 140 to induce the tri-axial motion of wheels 124, 140 with respect to automobile body 110. Auxiliary power unit 166 is connected to each translator mechanism 180 at wheels 124, 140 by a dedicated control line 170, 172, 174, 176.

Figure 3:
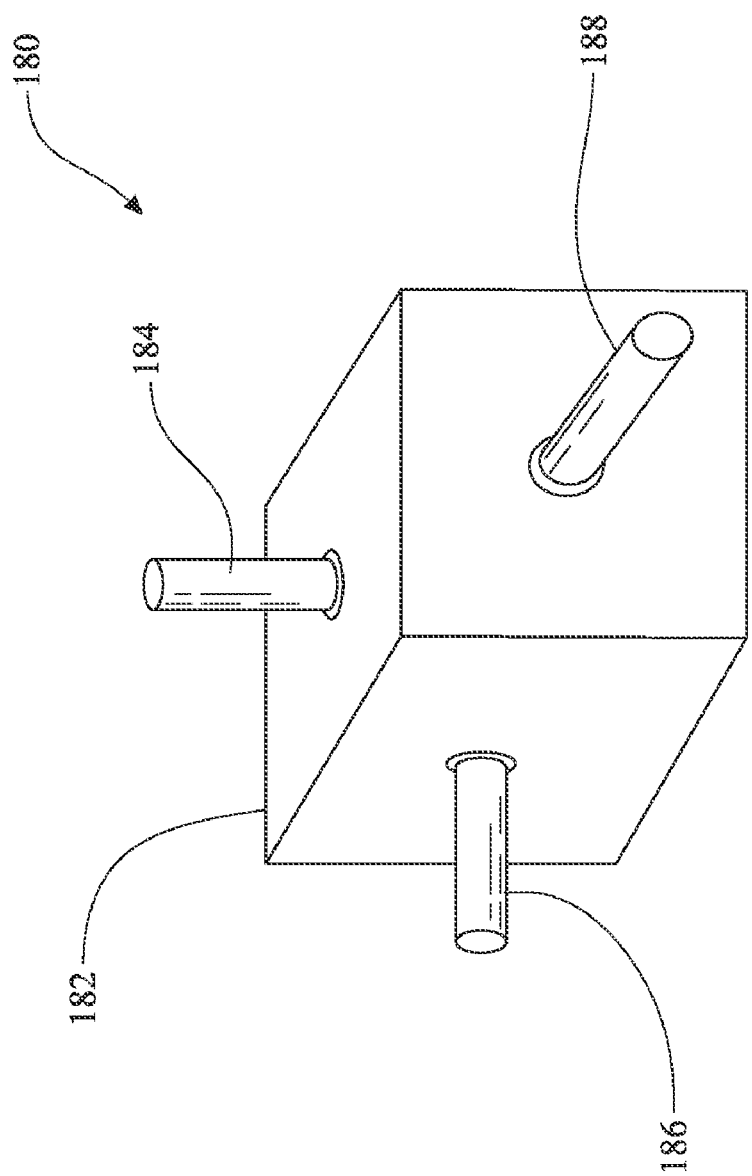
FIG. 3 presents a perspective view of a translator for use in translating automobile wheels with respect to the automobile body in three degrees of motion.

Referring to FIG. 3, translator unit 180 has a housing 182 in which are mounted hydraulic actuators oriented along each of the three orthogonal axes 102, 104, 106 described above. A piston rod associated with each actuator extends out of and is hydraulically movable with respect to housing 182. Thus, Z-piston rod 184 is oriented to correspond with Z-axis 102, X-piston rod 186 is oriented to correspond with X-axis 106, and Y-piston rod 188 is oriented to correspond with Y-axis 104. In the embodiment illustrated herein, auxiliary power unit 166 provides hydraulic power through control lines 170, 172, 174, 176 to the hydraulic actuators within translator mechanisms 180 to provide the powered linear motion of the respective piston rods. Piston rods 184, 186, 188 can be actuated to provide powered motion in both directions along its assigned axis of travel. However, other modes of power transmission are contemplated such as electro-mechanical power wherein control lines 170, 172, 174, and 176 are electrically conductive to power electro-mechanical actuators mounted within housing 182.

As illustrated in FIG. 5, control line 170 interconnects auxiliary power unit 166 to translator mechanism 180 mounted at left rear wheel 124. Control line 172 connects auxiliary power unit 166 to right rear wheel 124 (deleted for clarity). Translator mechanism 180 can be affixed to translator mount 130, which in turn is affixed to second axle housing 128. Piston rods 184, 186, 188 are affixed to automobile frame in such manner that actuation of the hydraulic actuators in housing 182 cause wheel 124 to translate, for example, laterally along X-axis 106 by second axle housing 128 telescopically sliding within first axle housing 126. In similar manner, actuation of translator mechanism 180 can be made in any one or all of the three axes 102, 104, 106 with respect to automobile body 110 according to the power inputs transmitted by auxiliary power unit 166.

In like manner and as illustrated in FIG. 6, control line 174 interconnects auxiliary power unit 166 to translator mechanism 180 mounted at left front wheel 140. Control line 176 connects auxiliary power unit 166 to right front wheel 140 (deleted for clarity). Translator mechanism 180 can be affixed to interface between automobile body 110 and suspension arms 142, 144 to cause wheel 140 to translate in one or all of the three axes 102, 104, 106 with respect to automobile body 110 according to the power inputs transmitted by auxiliary power unit 166.

Figure 4:
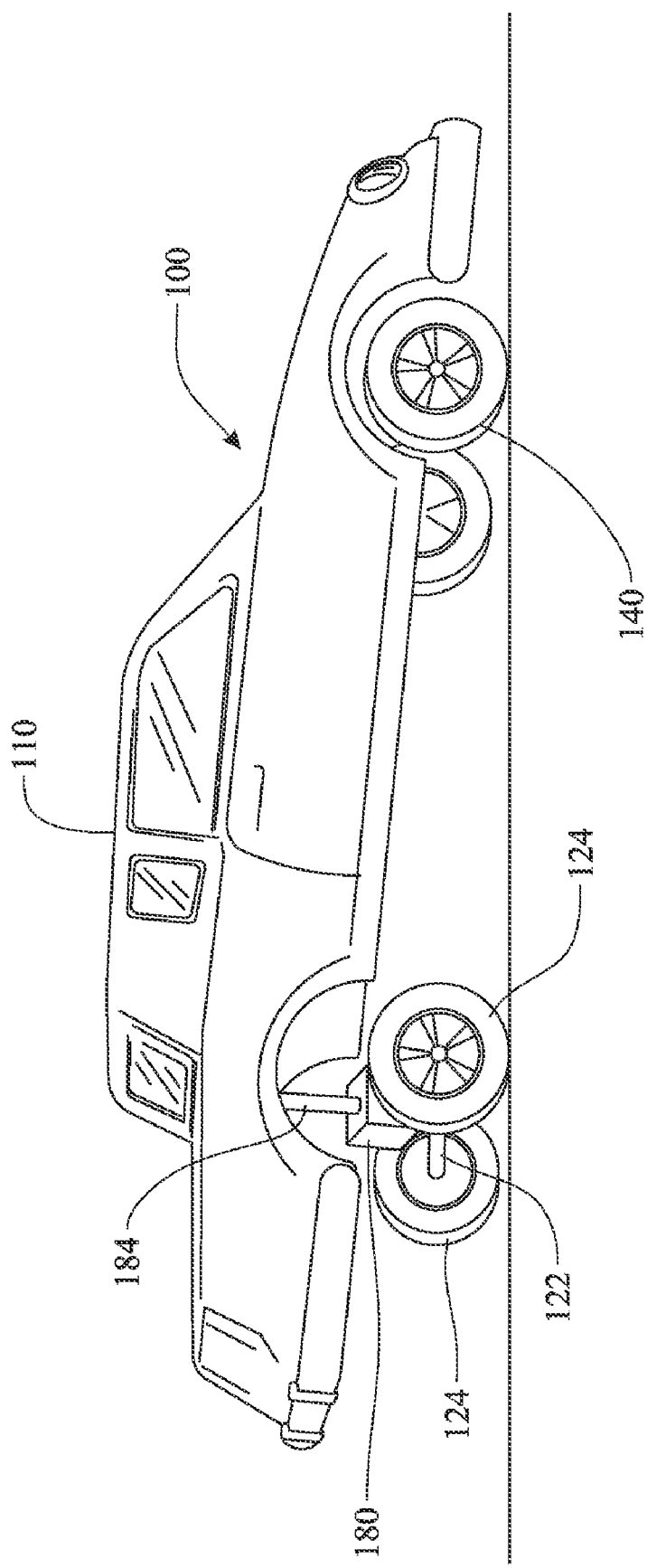
FIG. 4 presents an modified automobile having a translator mounted between the right rear wheel and the body.

In use, and as illustrated in FIG. 4, an automobile 100 having wheels 124, 140 independently movable with respect to automobile body 110 has an automobile motion system 160 installed, here represented by a translator mechanism 180 for clarity, whereby translators 180 are mounted at each wheel 124, 140. Translator mechanism 180, through actuation of one of its internal hydraulic actuators, causes X-piston rod to extend thereby raising automobile body 110 at the location of right rear wheel 124. The remaining translator mechanisms 180 can likewise be activated to cause wheels 124, 140 to translate along any of the three axes of motion 102, 104, 106 according to controls signals generated by central processing unit 162 to auxiliary power unit 166 and transmitted to individual translator units 180. The desired motions of wheels 124, 140 with respect to body 110 can be controlled manually from within automobile 100 using a set of manual controls (not shown), or the motions can be generated automatically through a pre-programmed sequence by central processor 162.

Figure 23:
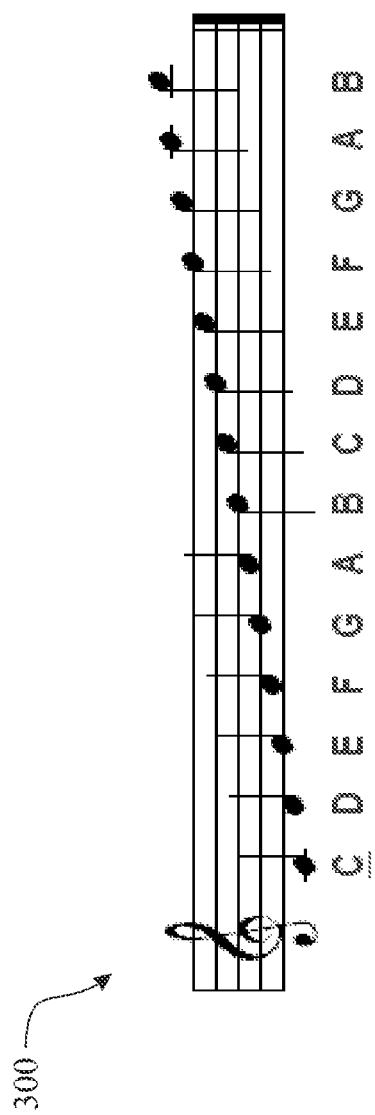
FIG. 23 presents an exemplary musical scale in the key of 'C'.

One example of a preprogrammed sequence of movements is shown by choreographing the sequenced movements of the actuators of translator mechanisms 180 to correspond with a musical composition. Each note played can be assigned a displacement value in the X, Y, and Z axes. The distances will be preassigned based on the musical scale set in any key. For example, a musical scale in the key of 'C' 300 is illustrated in FIG. 23. The scale 300 can start at any assigned position, and the linear distance that the piston rods 184, 186, 188 are extended and retracted are based upon the musical composition on which it is choreographed and the range of notes utilised in the composition. Here, the fourteen notes of 'C' through 'B' are assigned the numbers of 1 through 14 beginning with the low 'C' assigned the number 1 and the high 'B' assigned the number 14. Each number in turn represents a like number of units of motion of piston rods 184, 186, 188.

Figure 24:
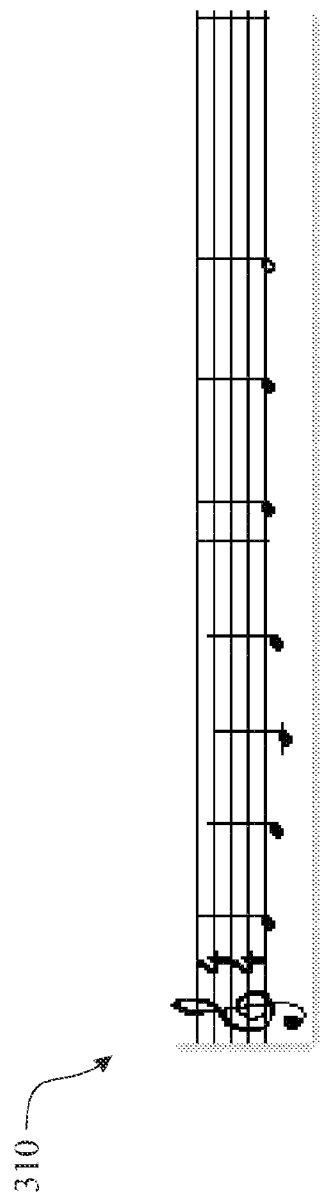
FIG. 24 presents an exemplary musical composition.

An exemplary simple composition 310 that can be used is "Mary Had a Little Lamb" is illustrated in FIG. 24. The notes in sequence are E-D-C-D-E-E-E and have the assigned motion values of 3-2-1-2-3-3-3. Central processing unit 162 through execution of the instruction set stored in memory module 164 coordinates the playing of the sequential notes of the musical composition and simultaneously generates the required signals to cause auxiliary power unit 166 to provide the power signals to the individual actuators in each translator mechanism 180. In this manner, automobile 100 can be caused to move in any combination of three-axis movement through the independent movement of wheels 124, 140 with respect to automobile body 110 thereby rendering automobile 100 to appear as 'dancing' to the corresponding musical composition being played. Alternatively, the preprogrammed motion sequence of automobile 100 can also correspond to other sensory inputs generated by central processor unit 162, such as a light show.

Figure 7:
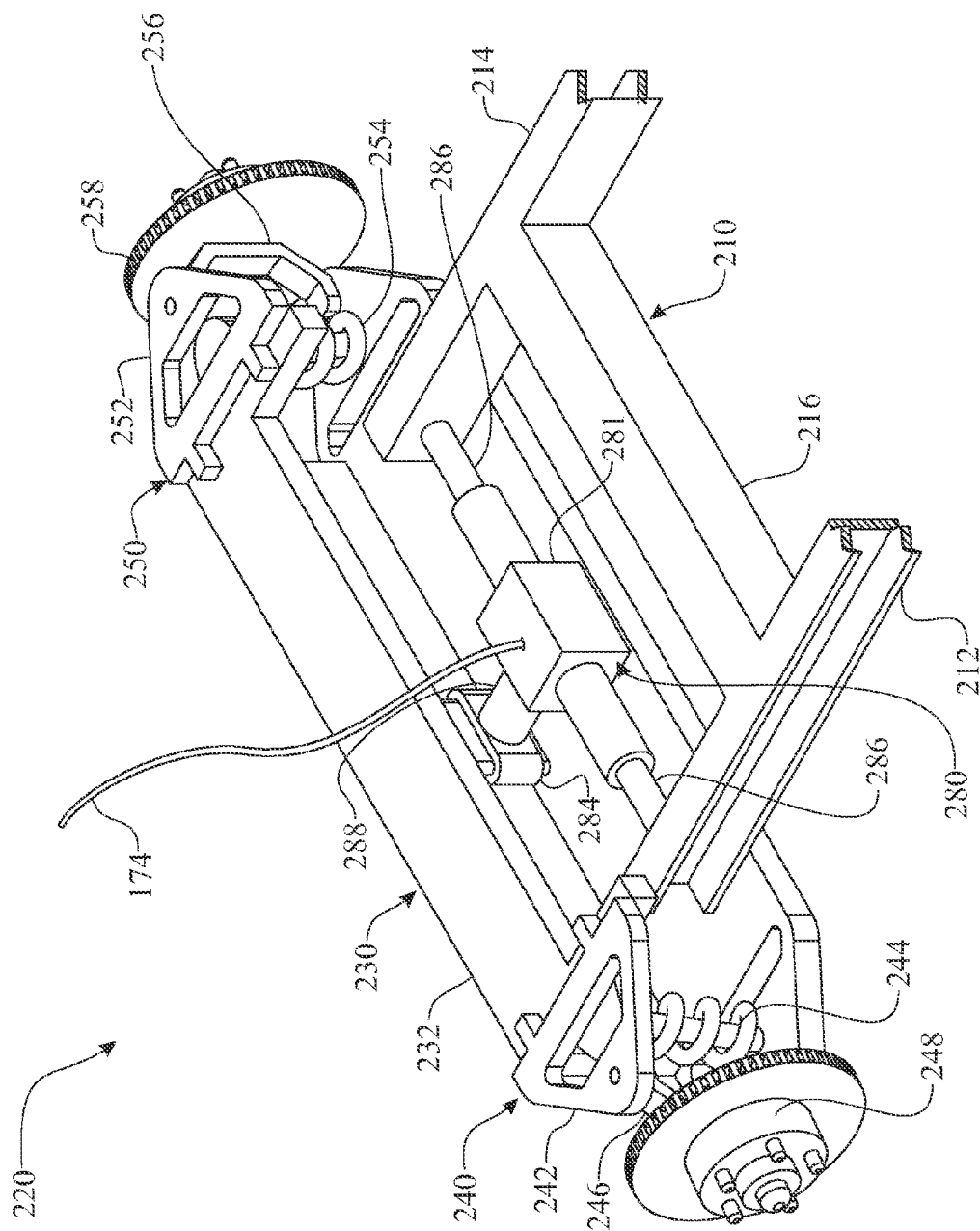
FIG. 7 presents a top rear isometric view of an alternate embodiment front suspension assembly motionally interfaced with a vehicle main frame for a motion system for an automobile utilizing a single translator.
Figure 8:
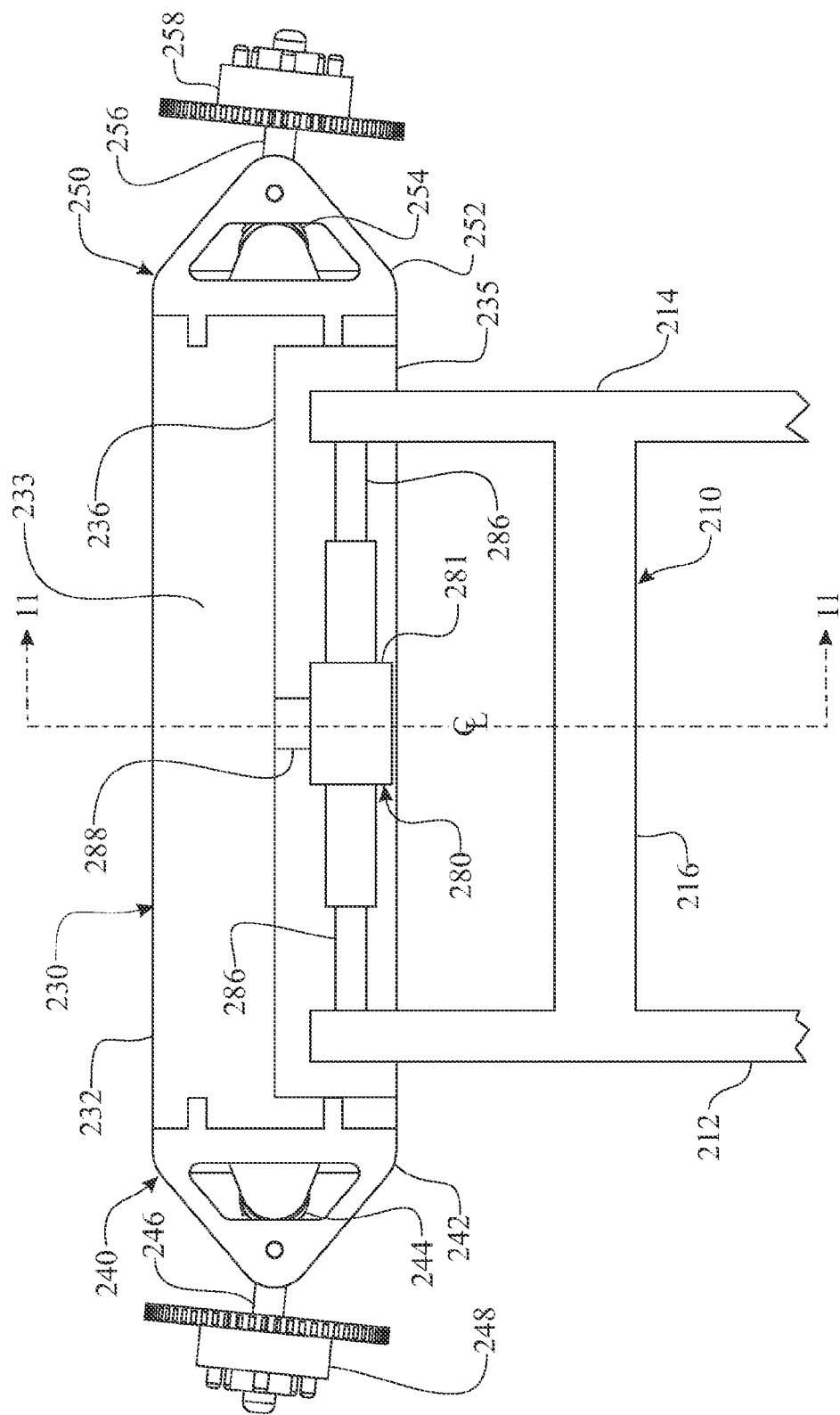
FIG. 8 presents a top plan view of the front suspension assembly with the vehicle main frame laterally centered.

Turning now to FIGS. 7 through 8, an alternate embodiment vehicle motion system 220 is illustrated wherein an automobile or vehicle body such as automobile body 110 (FIG. 1) can be mounted on a main frame 210 having a left frame member 212 and a right frame member 214 interconnected by one or more cross members 216. In all the figures, the automobile body 110 has been eliminated for clarity. Therefore, while the subsequent embodiment descriptions refer to the main frame 110, those practiced in the art will recognize that references to the main frame 210 can also include or be substituted by the automobile body 110.

The main frame 210, and as representative of the automobile body 110, is the central structural element of the vehicle motion system 220. To accomplish the desired independent movement of the main frame 210 with respect to the automobile's wheels 124 (FIG. 1), the front and rear suspensions must be movably supported from the main frame 210. FIGS. 7-8 illustrate such movable support wherein a front suspension assembly 230 is interconnected with the main frame 210 by a translator 280.

The front suspension assembly 230 has a front suspension sub-frame 232 which is formed as a "C" beam having a top cap 233 and a bottom cap 235 interconnected by a vertical web 234. The top cap 233 defines a cutout area 236 to permit the translational movement of the main frame 210. The sub-frame 232 extends between and supports left and right suspension mechanisms 240, 250 respectively. The left and right suspension mechanisms 240 and 250 are substantially identical and are mirror images one of the other, wherein the left suspension mechanism 240 includes an upper A-arm 242 and a lower A-arm 243 hinged to the left end of the upper cap 233 and the lower cap 235 of the sub-frame 232 respectively. A coil over shock 244 extends between the upper cap 233 and the lower A-arm 243. A spindle 256 is pivotally supported between the upper A-arm 242 and the lower A-arm 243 and has attached thereto a wheel hub 248 for mounting the automobile wheel 124 (FIG. 1). The right suspension mechanism 250 includes like elements with like function and are identified with the same suffix numeral preceded by the numerals "25".

The translator 280 includes a housing 281 and at least one actuator oriented along each of the three orthogonal axes, namely the lateral X-axis 106 (FIG. 2), the longitudinal Y-axis (FIG. 1), and the vertical Z-axis (FIG. 1). The translator 280 is substantially centered between the left frame member 212 and the right frame member 214 of the main frame 210. The translator 280 includes opposed lateral (X-axis) actuators 286 extending from the housing 281 to the respective ones of the left frame member 212 and the right frame member 214. The opposed lateral actuators 286 are slaved one to the other such that the extension of one lateral actuator 286 results in a like retraction of the opposing lateral actuator 286. The longitudinal (Y-axis) actuator 288 extends forwardly from the housing 281 and terminates at the vertical (Z-axis) actuator 284. The vertical actuator 284 extends between the top cap 233 and the bottom cap 235 of the front suspension sub-frame 232. In this manner, and through the operation of the lateral actuators 286, the longitudinal actuator 288, and the vertical actuator 284, the main frame 210 (and thus, the automobile body 110 affixed thereto) can be translated in three dimensions or axes with respect to the front suspension assembly 230 as most clearly seen in FIGS. 8-14.

Figure 9:
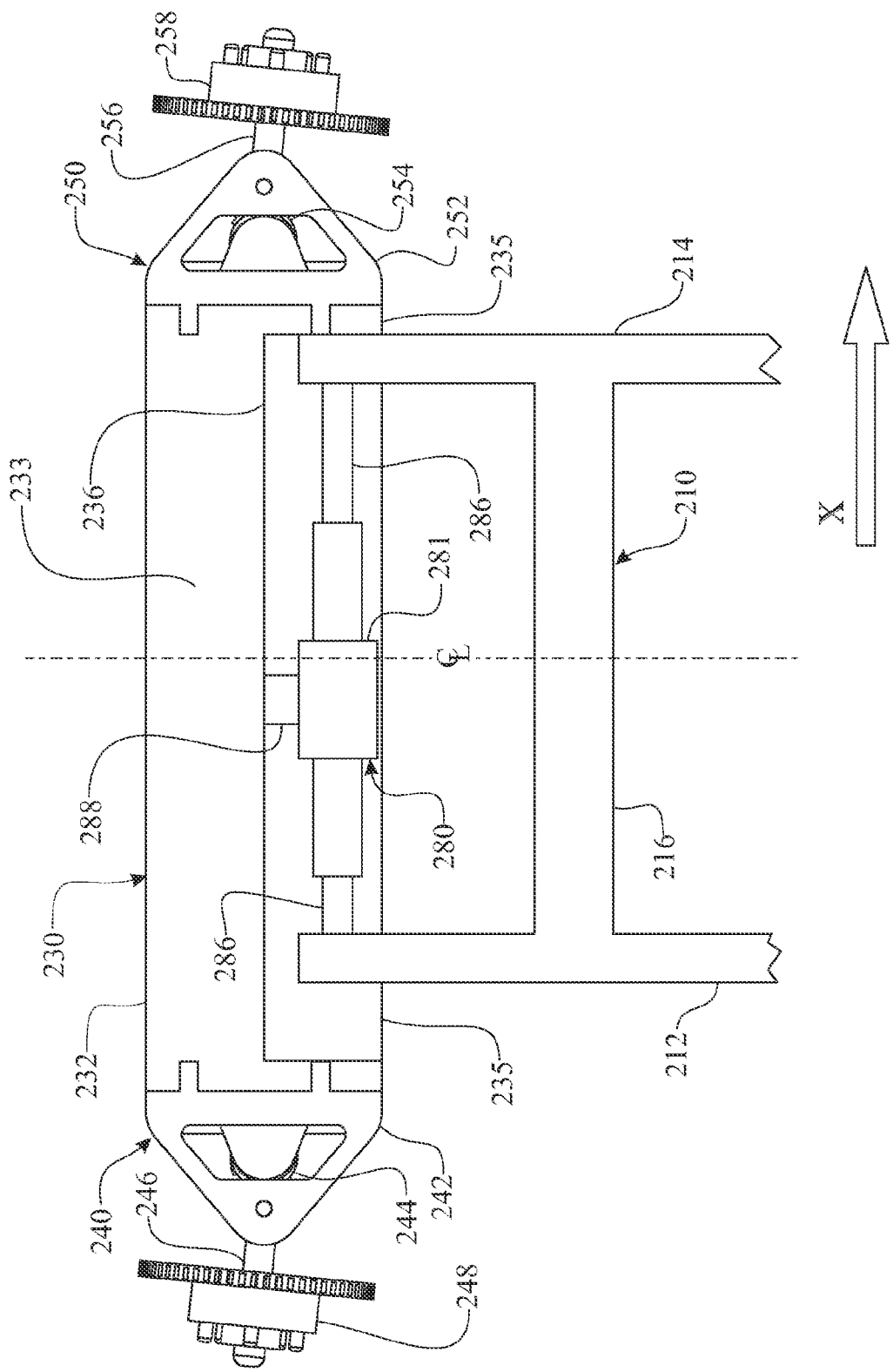
FIG. 9 presents a top plan view of the front suspension assembly with the vehicle main frame laterally translated to the right of centerline.
Figure 10:
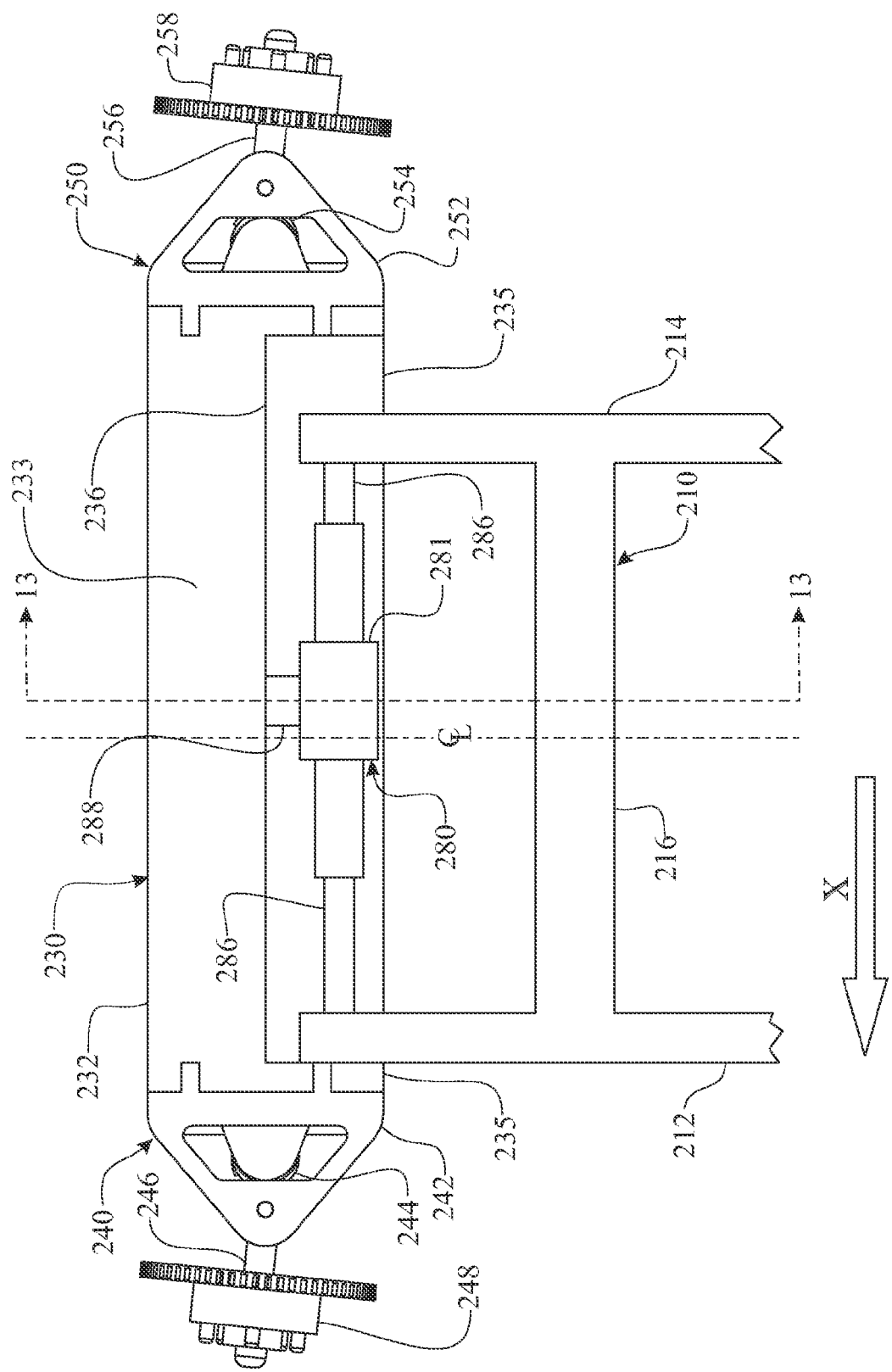
FIG. 10 presents a top plan view of the front suspension assembly with the vehicle main frame laterally translated to the left of centerline.

Referring now to FIGS. 8 through 14, the above described elements are referenced with their respective reference numbers for orientation, but will only be discussed to the extent they are related to the various translations resulting from the operation of actuators 284, 286, and 288 as shown in the figures. FIG. 8 illustrates the main frame 210 in its neutral state or position laterally centered with respect to the front suspension assembly 230. FIG. 9 illustrates the lateral (X-axis) translation of the main frame 210 the right wherein the right frame member 214 bears along the right side of cutout area 236. Further, as illustrated, the opposed lateral actuators 286 are slaved one to the other such that the extension of the lateral actuator 286 affixed to the right frame member 214 equals the retraction of the lateral actuator 286 affixed to the left frame member 212. FIG. 10 illustrates the lateral (X-axis) translation of the main frame 210 to the left wherein the left frame member 212 bears along the left side of cutout area 236.

Figure 13:
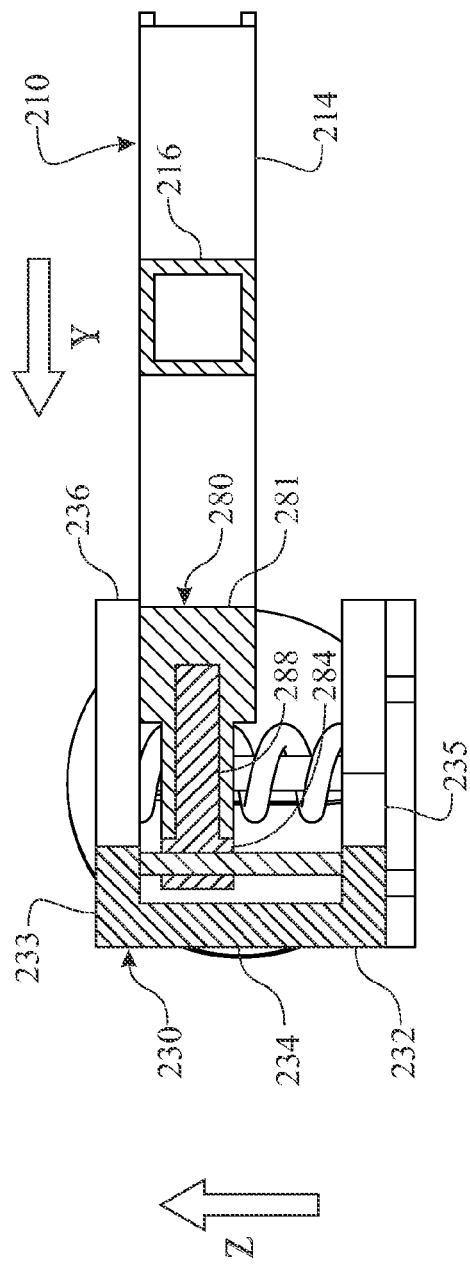
FIG. 13 presents a side elevation cross-sectional view of the suspension of FIG. 10, taken along the line 13-13 of FIG. 10 illustrating the vehicle main frame translated in a raised position and translated longitudinally forward with respect to the front suspension assembly.
Figure 14:
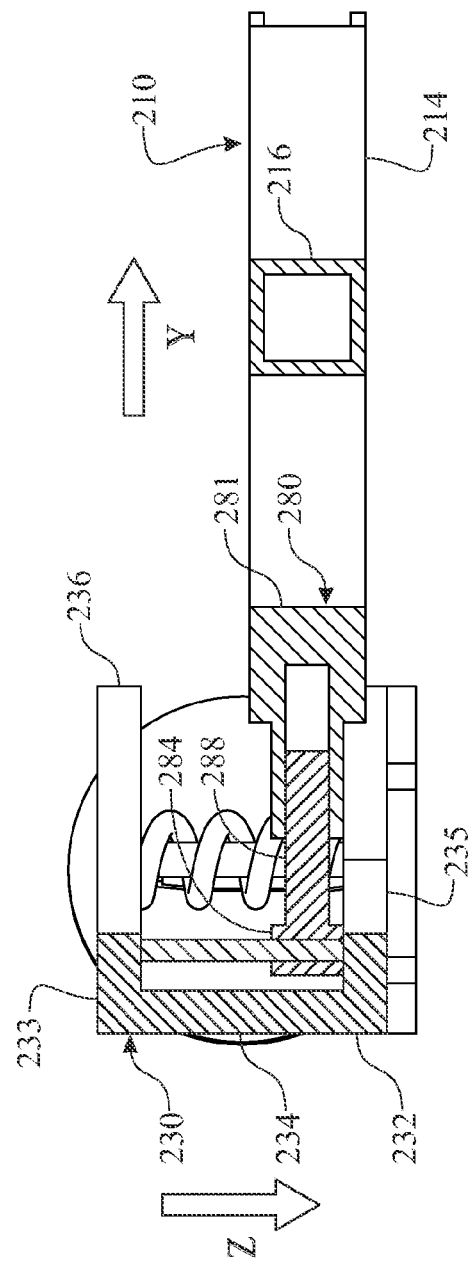
FIG. 14 presents the side elevation cross-sectional view of FIG. 13 illustrating the vehicle main frame lowered and translated longitudinally rearward with respect to the front suspension assembly.

As illustrated in FIGS. 11 through 14, additional positional translations of the main frame 210 with respect to the front suspension assembly 230 are shown. FIG. 11 shows the longitudinal (Y-axis) translation of the main frame 210 in its forward position with actuator 288 retracted and the vertical (Z-axis) translation of the actuator 284 placing the main frame 210 in its raised position. FIG. 12 shows the longitudinal translation of the main frame 210 in its forward position and the vertical translation of the main frame 210 in its lowered position. FIG. 13 shows the longitudinal translation of the main frame 210 in its forward position and the vertical translation of the main frame 210 in its raised position. FIG. 14 shows the longitudinal translation of the main frame 210 in its rearward position and the vertical translation of the main frame 210 in its lowered position.

Figure 15:
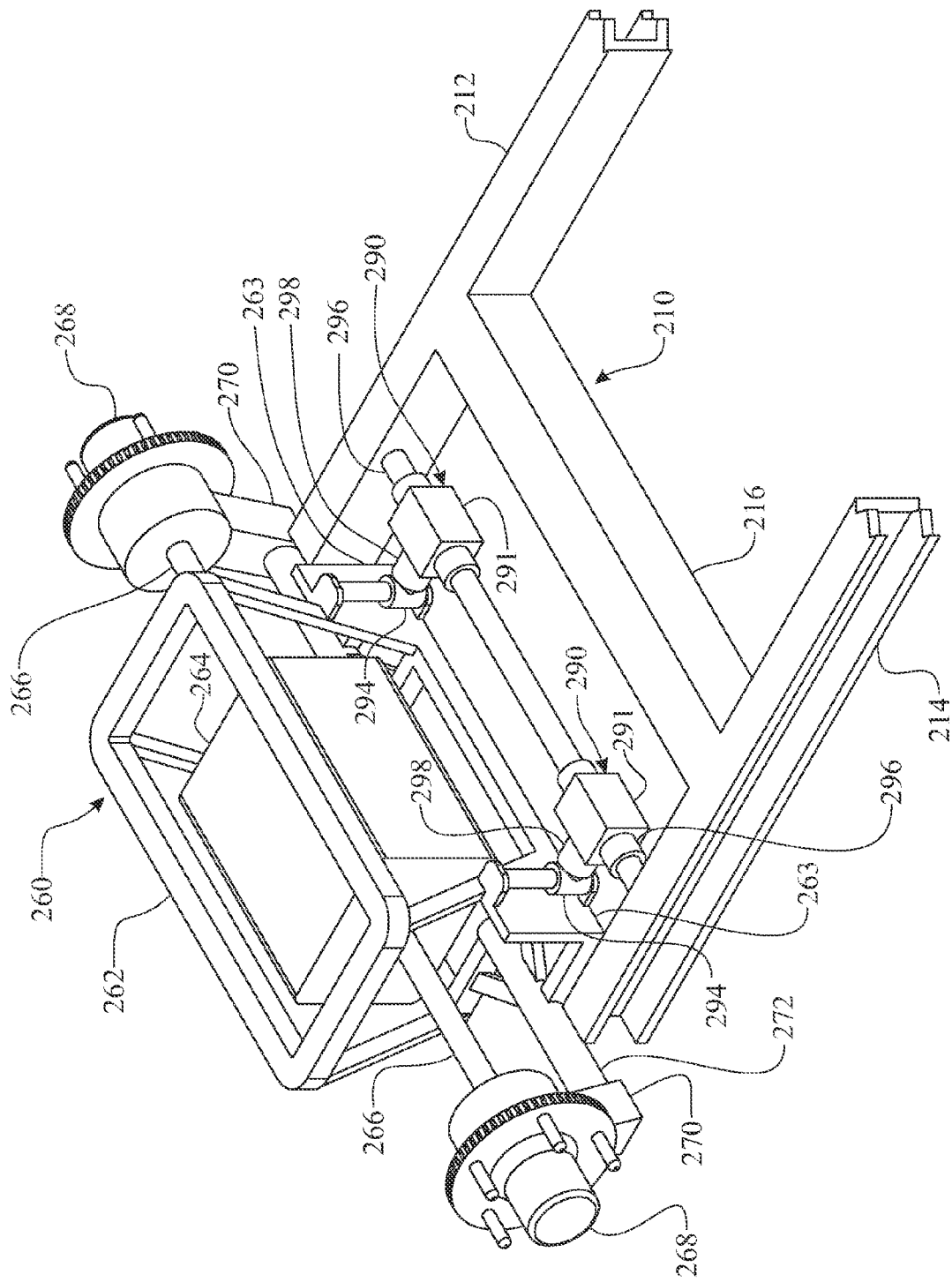
FIG. 15 presents a top front isometric view of an alternate embodiment rear suspension assembly motionally interfaced with a vehicle main frame for a three axis motion system for an automobile utilizing dual translators.
Figure 16:
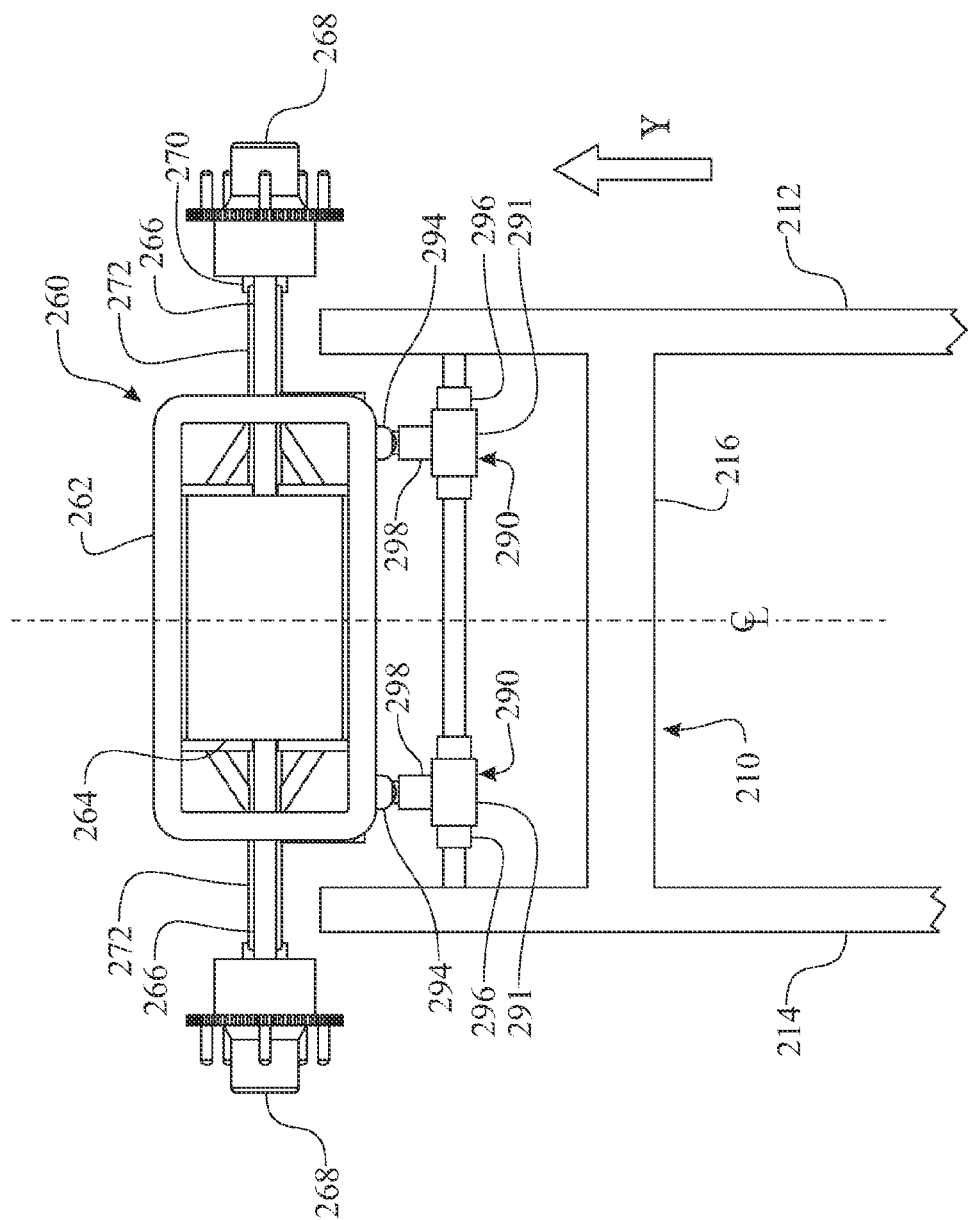
FIG. 16 presents a top plan view of the rear suspension assembly with the vehicle main frame laterally centered.

Turning now to FIGS. 15 through 16, the rear suspension assembly 260 is shown movably supported from the main frame 210. The rear suspension assembly 230 has a rear suspension sub-frame 262 formed as an integrated cage in which a drive differential 264 is mounted (a drive shaft from the automobile engine has been deleted for clarity). A drive axle 266 extends from each side of the drive differential 264 and terminates on the left and the right at the wheel hubs 268 onto which the wheels 124 are mounted. A control arm 272 also extends from the rear suspension sub-frame 262 in a parallel fashion to the axles 266 and support at left and right ends thereof a bearing shaft support assembly 270 which supports in rotating fashion the axles 266 and the wheel hubs 268. The rear suspension sub-frame includes at a lower front portion thereof two supports 263 for the attachment of translators 290.

The rear portion of the main frame 210 is interconnected to the rear suspension assembly 260 by two translators 290. The translator 290 is a second exemplary translator and is arranged at the rear of the main frame 210 such that one translator 290 is positioned at a left rear of the main frame 210 and one translator 290 is positioned at a right rear of the main frame 210. Further, both of the translators 290 are laterally aligned one with the other along a lateral (X) axis and are affixed to extend from the left frame member 212 of the main frame 210 to the right frame member 214 in a manner that the lateral actuators 296 are axially aligned. Further, the two translators 290 are slaved together such that when the lateral actuators 296 are activated, both of the translators 290 move in concert to laterally translate the main frame 210 with respect to the rear suspension assembly 260.

Each of the translators 290 has a longitudinal actuator 298 extending from the housing 291 to the supports 263 on the rear suspension sub-frame 262. Each of the translators 290 further includes a vertical actuator 294 at the end of the longitudinal actuator 298 and is movably integrated with the supports 263.

Figure 17:
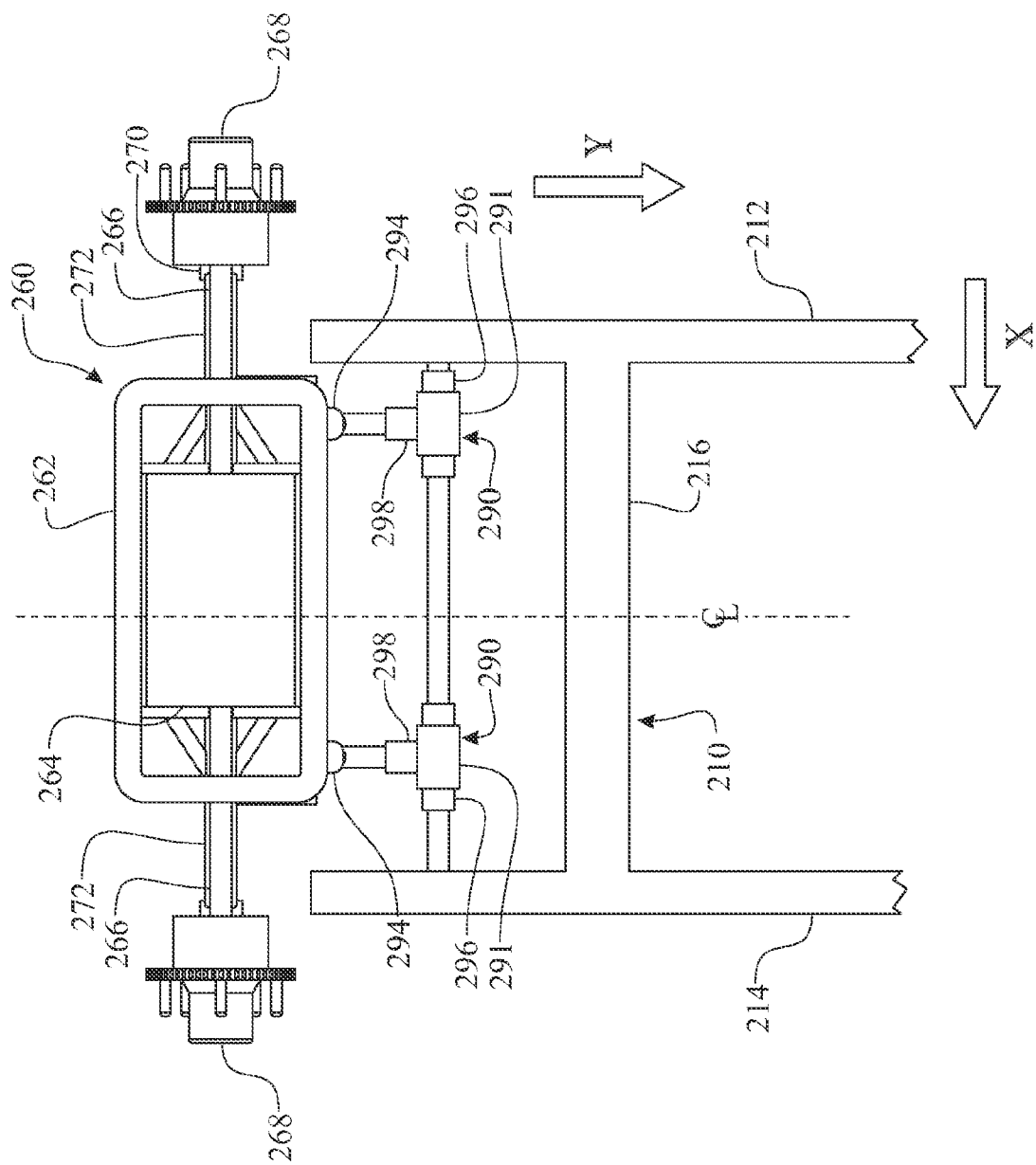
FIG. 17 presents a top plan view of the rear suspension assembly with the vehicle main frame laterally translated to the right of centerline.
Figure 18:
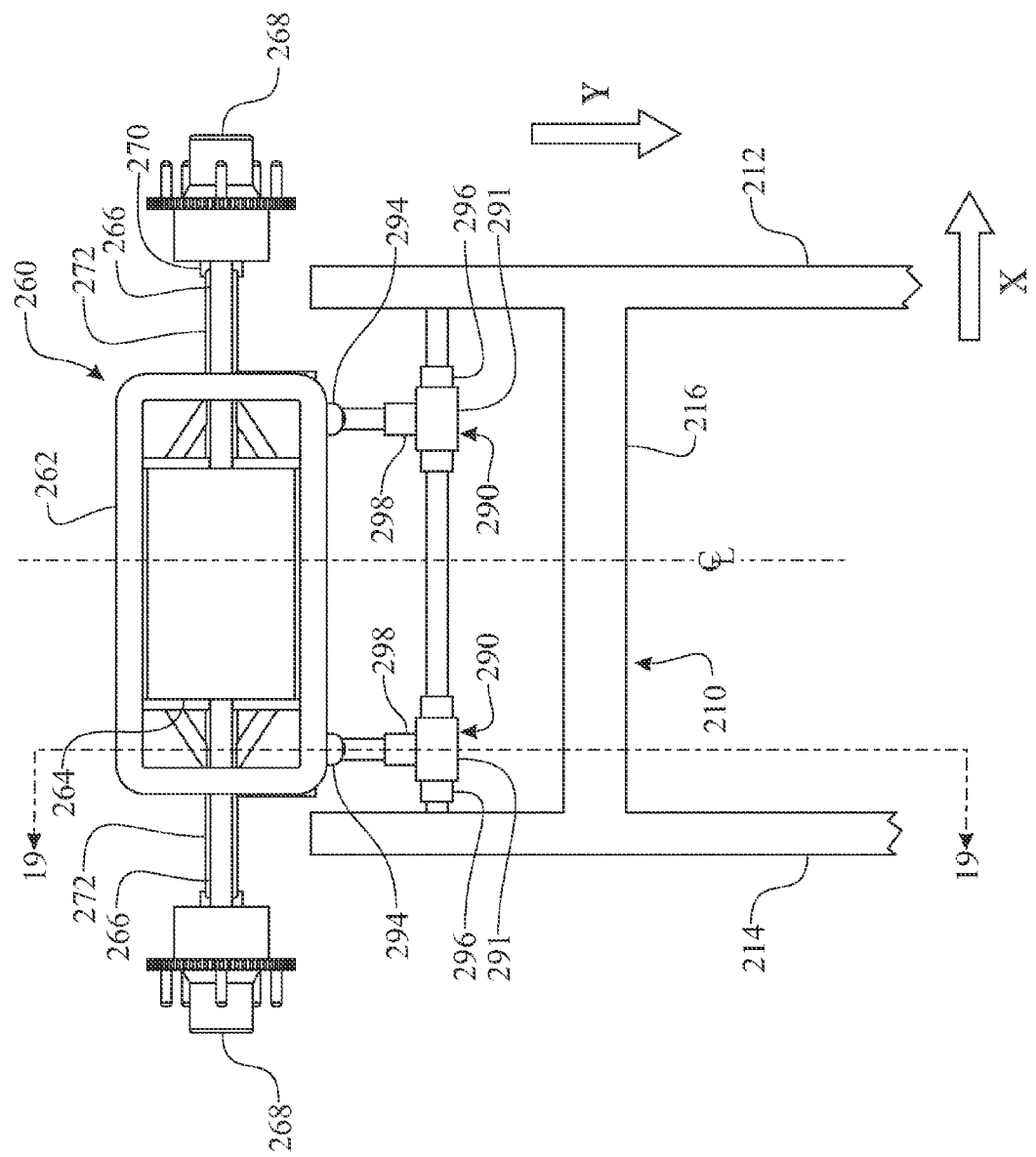
FIG. 18 presents a top plan view of the rear suspension assembly with the vehicle main frame laterally translated to the left of centerline.

Referring now to FIGS. 16 through 22, the above described elements are referenced with their respective reference numbers for orientation, but will be discussed only to the extent they are related to the various translations resulting from the operation of actuators, 294, 296, and 298 as shown in the figures. FIG. 16 illustrates the main frame 210 in its laterally neutral state or position laterally centered with respect to the rear suspension assembly 260, and further wherein the longitudinal actuators 298 are fully retracted to translate the main frame 210 closest to the rear suspension assembly 260. FIG. 17 shows the lateral (X-axis) translation of the main frame 210 to the right wherein the lateral actuator 296 of the left translator 290 is fully retracted and the lateral actuator 296 of the right translator 290 is oppositely extended to maintain an equal spacing between the translators 290. Additionally, the longitudinal (Y-axis) actuators 294 are fully extended thereby translating the main frame 210 forward from the rear suspension assembly 260. FIG. 18 illustrate the lateral (X-axis) translation of the main frame 210 to the left wherein the lateral actuator 296 of the left translator 290 is fully extended and the lateral actuator 296 of the right translator 290 is oppositely retracted to maintain an equal spacing between the translators 290. Additionally, the longitudinal (Y-axis) actuators 294 are fully extended thereby translating the main frame 210 forward from the rear suspension assembly 260.

As illustrated in FIGS. 19-20, additional positional translations of the main frame 210 with respect to the rear suspension assembly 260 are shown. FIG. 19 shows the longitudinal (Y-axis) translation of the main frame 210 in its rearmost position with actuator 298 retracted and the vertical (Z-axis) translation of the actuator 294 placing the main frame 210 in its raised position. FIG. 20 shows the longitudinal translation of the main frame 210 in its rearmost position and the vertical translation of the main frame 210 in its lowered position. FIG.

21 shows the longitudinal translation of the main frame 210 in its rearmost position and the vertical translation of the main frame 210 in its raised position. FIG. 22 shows the longitudinal translation of the main frame 210 in its forward position and the vertical translation of the main frame 210 in its raised position.

Those practiced in the art will readily recognize that motion system 220 can be implemented utilizing a single translator 280 for the interconnection between each of the front and rear suspension assemblies 260, 290 and the main frame 210, utilizing a single translator 280 at one of the front or rear suspension assemblies 260, 290 and a dual translator 290 configuration at the other of the front or rear suspension assemblies 260, 290, or utilizing a dual translator 290 configuration at both of the front and rear suspension assemblies 260, 290. Also, actuators 284, 286, 288, 294, 296, and 298 can be hydraulic actuators, electromechanical actuators, or other known translational actuators.

In use, a user can design a desired programmed sequence of automobile translations and load that programmed sequence of translations into the memory 164 in a form accessible by an instruction set also stored in the memory 164 and executable by the central processing unit 162. When the choreographed translations are desired to be demonstrated, the instruction set is recalled by the central processing unit 162 and executed by the central processing unit 162. During execution, the central processing unit 162 sends translation commands either directly to translators 280 or 290 over communication lines 170, 172, 174, and 176. Alternatively, central processing unit 162 can communicate the translational commands to a auxiliary power unit 166 which in turn powers translators 280, 290 at their respective locations in motion system 220 to effect the desired translational sequence through the extensions and retractions of the various actuators 284, 286, 288, 294, 296, and 298. In addition to a preprogrammed sequence of translations, a musical composition can also be loaded in the memory 164 and one or more predefined choreographed movements of the automobile body can be coordinated with desired passages of the musical composition. Also, a translational value of each of the actuators 284, 286, 288, 294, 296, and 298 at the front and rear of the main frame 210 can be assigned for each note of a musical scale so that when the musical composition is played, each of the actuators 284, 286, 288, 294, 296, and 298 responds translationally according to the pre-assigned translational values for each particular musical note played during the playback of the musical composition.

Although the above disclosure is directed towards a standard sized automobile, it is understood that the same mechanisms and resulting motions can be applied to any size vehicle, including oversized land vehicles, miniaturized vehicles, scaled toys, radio controlled toys, preprogrammed toys, and the like.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

I claim:

1. An automobile motion system for choreographed independent movement in three degrees of freedom of an automobile body with respect to the automobile wheels, said automobile motion system comprising:
    a central processing unit;
    a memory communicative with said central processing unit;
    an instruction set resident on said memory and executable by said central processing unit, execution of said instruction set causing said central processing unit to output a programmed sequence of signals;
    a main frame for mounting the automobile body thereon;
    a front suspension assembly;
    at least one front translator communicative with said central processing unit and interconnecting said front suspension assembly with said main frame for independently translating the body of the automobile in three axes with respect to said front suspension assembly, said front translator responsive to said programmed sequence of signals to move the automobile body with respect to said front suspension assembly in response to said programmed sequence of signals;
    a rear suspension assembly; and
    at least one rear translator communicative with said central processing unit and interconnecting said rear suspension assembly with said main frame for independently translating the body of the automobile in three axes with respect to said rear suspension assembly, said rear translator responsive to said programmed sequence of signals to move the automobile body with respect to said rear suspension assembly in response to said programmed sequence of signals.

2. The automobile motion system according to claim 1 further including an auxiliary power unit communicative with said central processing unit and responsive to said programmed sequence of signals, said auxiliary power unit further communicative with and powering each said translator in said three dimensional translations.

3. The automobile motion system according to claim 1 wherein said front suspension assembly includes:
    a front sub-frame interfaced with said translator;
    a left suspension mechanism;
    a right suspension mechanism; and
    a wheel hub attached to each of said left and said right suspension mechanisms.

4. The automobile motion system according to claim 3 including a left front translator for interconnecting a left side of said front sub-frame with a left front portion of said main frame, and including a right front translator for interconnecting a right side of said front sub-frame with a right front portion of said main frame.

5. The automobile motion system according to claim 1 wherein said rear suspension assembly includes:
    a rear sub-frame interfaced with said translator;
    a left suspension mechanism;
    a right suspension mechanism; and
    a wheel hub attached to each of said left and said right suspension mechanisms.

6. The automobile motion system according to claim 5 including a left rear translator interconnecting a left side of said rear sub-frame with a left rear portion of said main frame, and including a right rear translator interconnecting a right side of said rear sub-frame with a right rear portion of said main frame.

7. The automobile motion system according to claim 1 wherein said three axes of translation are a vertical axis, a longitudinal axis, and a lateral axis.

8. The automobile motion system according to claim 7 wherein each said translator includes:
    a housing;
    at least one vertical actuator, translatable along said vertical axis with respect to said housing and affixed to one of said front sub-frame and said rear sub-frame;
    at least one longitudinal actuator translatable along said longitudinal axis with respect to said housing and affixed to one of said front sub-frame and said rear sub-frame; and at least one lateral actuator translatable along said lateral axis with respect to said housing and affixed to said main frame.

9. The automobile motion system according to claim 8 wherein each said translator includes two lateral actuators translatable along said lateral axis, said actuators being laterally opposed one to the other and slaved one to the other in a manner such that an extension of a first of said lateral actuators is matched by a retraction of a second of said lateral actuators.

10. A mounting structure for an automobile motion system to independently move an automobile body with respect to the automobile wheels, the mounting structure comprising:
   a main frame for mounting the automobile body thereon;
   a front suspension sub-frame for mounting a front suspension thereon;
   at least one front translator interconnecting said front suspension sub-frame with said main frame for independently translating said main frame in three axes with respect to said front suspension sub-frame, said front translator responsive to a programmed sequence of signals provided by an instruction set resident on a memory and executable by a central processing unit to translate said main frame with respect to said front suspension sub-frame;
   a rear suspension sub-frame for mounting a rear suspension thereon; and
   at least one rear translator interconnecting said rear suspension sub-frame with said main frame for independently translating said main frame in three axes with respect to said rear suspension sub-frame, said rear translator responsive to said programmed sequence of signals to move said main frame with respect to said rear suspension sub-frame.

11. The mounting structure for an automobile motion system according to claim 10 including a left front translator for interconnecting a left side of said front sub-frame with a left front portion of said main frame, and including a right front translator for interconnecting a right side of said front sub-frame with a right front portion of said main frame.

12. The mounting structure for an automobile motion system according to claim 10 including a left rear translator interconnecting a left side of said rear sub-frame with a left rear portion of said main frame, and including a right rear translator interconnecting a right side of said rear sub-frame with a right rear portion of said main frame.

13. The mounting structure for an automobile motion system according to claim 10 wherein said three axes of translation are a vertical axis, a longitudinal axis, and a lateral axis.

14. The mounting structure for an automobile motion system according to claim 13 wherein each said translator includes:
   a housing;
   at least one vertical actuator, translatable along said vertical axis with respect to said housing and affixed to one of said front sub-frame and said rear sub-frame;
   at least one longitudinal actuator translatable along said longitudinal axis with respect to said housing and affixed to one of said front sub-frame and said rear sub-frame; and
   at least one lateral actuator translatable along said lateral axis with respect to said housing and affixed to said main frame.

15. The mounting structure for an automobile motion system according to claim 14 wherein each said translator includes two lateral actuators translatable along said lateral axis, said actuators being laterally opposed one to the other and slaved one to the other in a manner such that an extension of a first of said lateral actuators is matched by a retraction of a second of said lateral actuators.

16. A method for choreographing independent movement in three degrees of freedom of an automobile body with respect to the automobile wheels using an automobile motion system, said method including the steps:
   obtaining an automobile, the automobile comprising:
      a central processing unit;
      a memory communicative with said central processing unit;
      an instruction set resident on said memory and executable by said central processing unit, execution of said instruction set causing said central processing unit to output a programmed sequence of signals;
      a main frame for mounting the automobile body thereon;
      a front suspension assembly;
      at least one front translator communicative with said central processing unit and interconnecting said front suspension assembly with said main frame for independently translating the body of the automobile in three axes with respect to said front suspension assembly, said front translator responsive to said programmed sequence of signals to move the automobile body with respect to said front suspension assembly in response to said programmed sequence of signals;
      a rear suspension assembly; and
      at least one rear translator communicative with said central processing unit and interconnecting said rear suspension assembly with said main frame for independently translating the body of the automobile in three axes with respect to said rear suspension assembly, said rear translator responsive to said programmed sequence of signals to move the automobile body with respect to said rear suspension assembly in response to said programmed sequence of signals;
   loading a programmed sequence of automobile body translations in the memory;
   executing the instruction set stored in the memory;
   sending from the central processor, sequential signals corresponding to the desired sequence of automobile body translations to the front and rear translators; and
   causing the translator actuators to extend and retract to effect the desired motion of the automobile body.

17. The method according to claim 16 wherein the loading step includes loading a musical composition to the memory.

18. The method according to claim 17 including after said loading step, the step of:
   assigning at least one predefined choreographed movement of the automobile body with a designated musical passage of the musical composition.

19. The method according to claim 18 wherein the assigning step comprises:
   assigning a translational value of the actuators of the front and rear translators for each note of a musical scale.

20. The method according to claim 19 wherein the causing step comprises:
   causing the translator actuators to extend and retract in concert to the playing of the musical composition by the central processing unit and according to the assigned musical scale translational value.

* * * * *